Aug. 30, 1927.
M. LA ROCCO
SHADING LENS
Filed Oct. 29, 1926
1,640,661
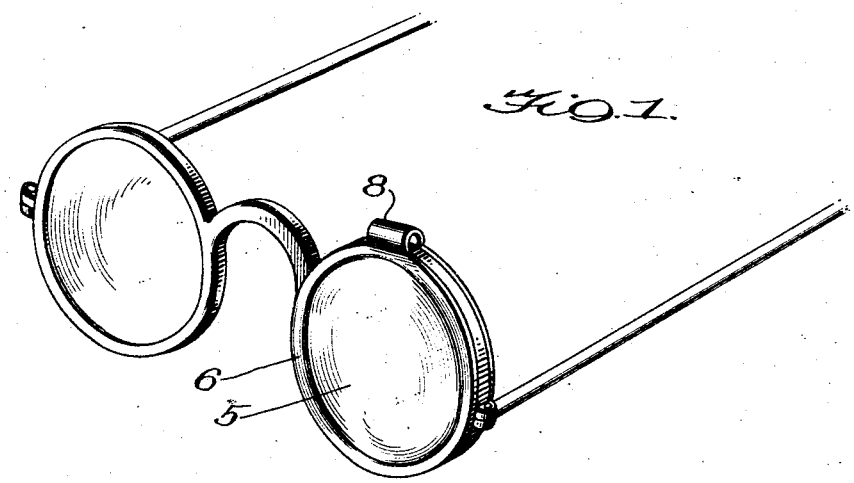
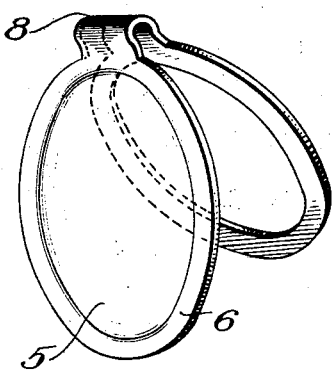
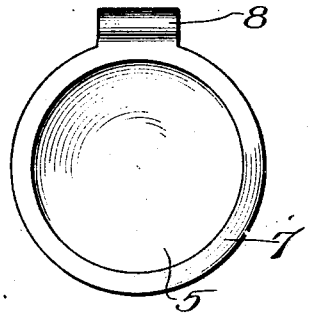
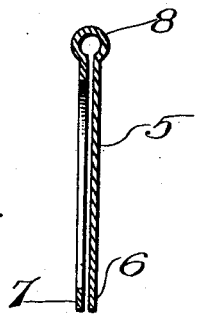
Inventor:-
MICHAEL LA ROCCO,
By Milo B Stevens & Co.
Attorneys.

Patented Aug. 30, 1927.

1,640,661

UNITED STATES PATENT OFFICE.

MICHAEL LA ROCCO, OF CHICAGO, ILLINOIS.

SHADING LENS.

Application filed October 29, 1926. Serial No. 144,996.

My invention relates to lenses of the type used for shading the eyes from the glare of the sun or of light as reflected from shining objects, such as sand or glazed paper, and its object is to provide an adjunct readily attachable to the common form of spectacles to retain their use while the novel shading lens protects the eyes from glare.

A further object of the invention is to so design the same that it will fit the spectacles neatly when applied, and exert an even hold thereon.

A further object of the invention is to construct the novel shading lens in one piece and devoid of fittings or joints to make the same cumbersome and apt to get out of order.

A final, but nevertheless important object of the invention is to design the same with utmost simplicity, whereby it may be manufactured at trifling cost.

With the above object in view, and any others that may suggest themselves from the specification and claims to follow, a better understanding of the invention may be gained by reference to the accompanying drawing, in which:—

Figure 1 is a perspective view of a typical pair of spectacles, showing the novel shading lens applied to one section thereof;

Fig. 2 is a perspective view of the lens as spread apart to better disclose its construction;

Fig. 3 is an elevation of the lens; and

Fig. 4 is a vertical section thereof.

To shield the eyes from glare, various types of shading glasses, sungoggles and the like have been used by those whose vision does not ordinarily require the use of spectacles. Where the latter are regularly worn as a matter of necessity, however, it will be seen that to replace them in the event of glare by shading glasses may eliminate or reduce the glare but will impair the vision, since the shading glasses are not ground to a prescription. Frequently the spectacles and the shading glasses are worn together, but this arrangement is cumbersome at best, looks unsightly, feels uncomfortable, and is frequently out of position.

In the novel embodiment, a shading lens is applied to each spectacle lens. As shown, the novel shading lens is formed in one piece, comprising the lens 5, its rim 6, a companion rim or ring 7, and an arched connector 8 for the rims 6 and 7. The lens 5 is clear amber or lavender in color, or of any other color suitable for shading lenses; and the rim and connector may be of the same color, or a dark and opaque color for contrast. The parts may be of even thickness, as shown, or varied in this respect if desired, such as by making the lens 5 thinner and therefore more transparent.

The novel shading lens is normally in closed or gathered form as shown in Fig. 4, but its connector 8 is sufficiently flexible to permit the spreading of the parts held thereby to receive the spectacle lens between them, the article being slid upon such lens until it fully straddles the same, as shown in Figure 1. The lens 5 is preferably in front of the spectacle lens, and the article holds in place by its inherent tension.

The novel article as mounted is neat and inconspicuous, and makes a good fit and appearance not only with spectacles of similar form—such as the circular form illustrated—but with lenses departing to some extent from that form. The device has no clips, fittings or joints for attaching purposes so that its appearance is not marred or detracting in any manner. Also, the thin and compact nature of the article enables it to be carried in pairs in a small envelope or case, suitable for a pocket in one's vest, wallet or purse.

I claim:

1. An attachment for the lenses of spectacles, comprising a shading lens applied to one side of the spectacle lens, a perforated disk applied to the other side thereof, and a tension device to connect and hold the shading lens and the disk to the spectacle lens.

2. An attachment for rim-encircled lenses of spectacles, comprising a shading lens applied to the rim of the spectacle lens from one side, a ring applied to the same from the opposite side, and a tension device to connect and hold the shading lens and the ring to said rim.

3. A shading lens comprising a transparently-colored disk, a ring in register with the same and in spaced relation, and an arched member connecting the disk and the ring at a common marginal site, said member having tension to maintain the disk and the ring in closely spaced relation.

In testimony whereof I affix my signature.

MICHAEL LA ROCCO.